United States Patent [19]

Chang et al.

[11] E Re. 31,069

[45] Reissued Oct. 26, 1982

[54] APPARATUS AND METHOD FOR RECORD REORIENTATION FOLLOWING ERROR DETECTION IN A DATA STORAGE SUBSYSTEM

[75] Inventors: Henry K. Chang; Wolfgang H. Hausen, both of San Jose, Calif.

[73] Assignee: International Business Machines Corporation, Armonk, N.Y.

[21] Appl. No.: 210,631

[22] Filed: Nov. 26, 1980

Related U.S. Patent Documents

Reissue of:

[64] Patent No.: 4,209,809
Issued: Jun. 24, 1980
Appl. No.: 940,949
Filed: Sep. 11, 1978

[51] Int. Cl.[3] ..... G11B 5/09

[52] U.S. Cl. ..... 360/53; 371/10

[58] Field of Search ..... 371/2, 32

[56] References Cited

U.S. PATENT DOCUMENTS 3,696,341 10/1972 Watts et al. ..... 360/39
3,717,846 2/1973 Kanda et al. ..... 340/146.1 F
3,725,861 4/1973 Hancock ..... 340/146.1 F
3,771,125 11/1973 Nagahuri et al. ..... 340/146.1 F
3,829,837 8/1974 Farr, Jr. ..... 360/48
4,059,748 11/1977 Violine ..... 340/146.1 F

*Primary Examiner*—Vincent P. Canney
*Attorney, Agent, or Firm*—Henry E. Otto, Jr.

[57] ABSTRACT

In an apparatus and method for record reorientation following error detection in a data storage subsystem each data track is subdivided into equal time-length recording cells which are sequentially numbered past an index point with the beginning of each field of each record coinciding with an initial cell for the field. Upon detection of a retriable error within a given field, the initial cell for the field is determined and stored, the subsystem is disconnected from an interfacing channel, and reorientation is attempted by advancing a transducer addressing the track past the index point to a location which is a selected distance upstream of the stored cell number. If a selected channel command is then received within a given time interval, the subsystem is reconnected to the channel and reorientation is effected as the transducer enters the field the initial cell of which was stored. If the selected channel command is received late, the subsystem waits one revolution of the track and then reorients without looking for further channel commands.

12 Claims, 10 Drawing Figures

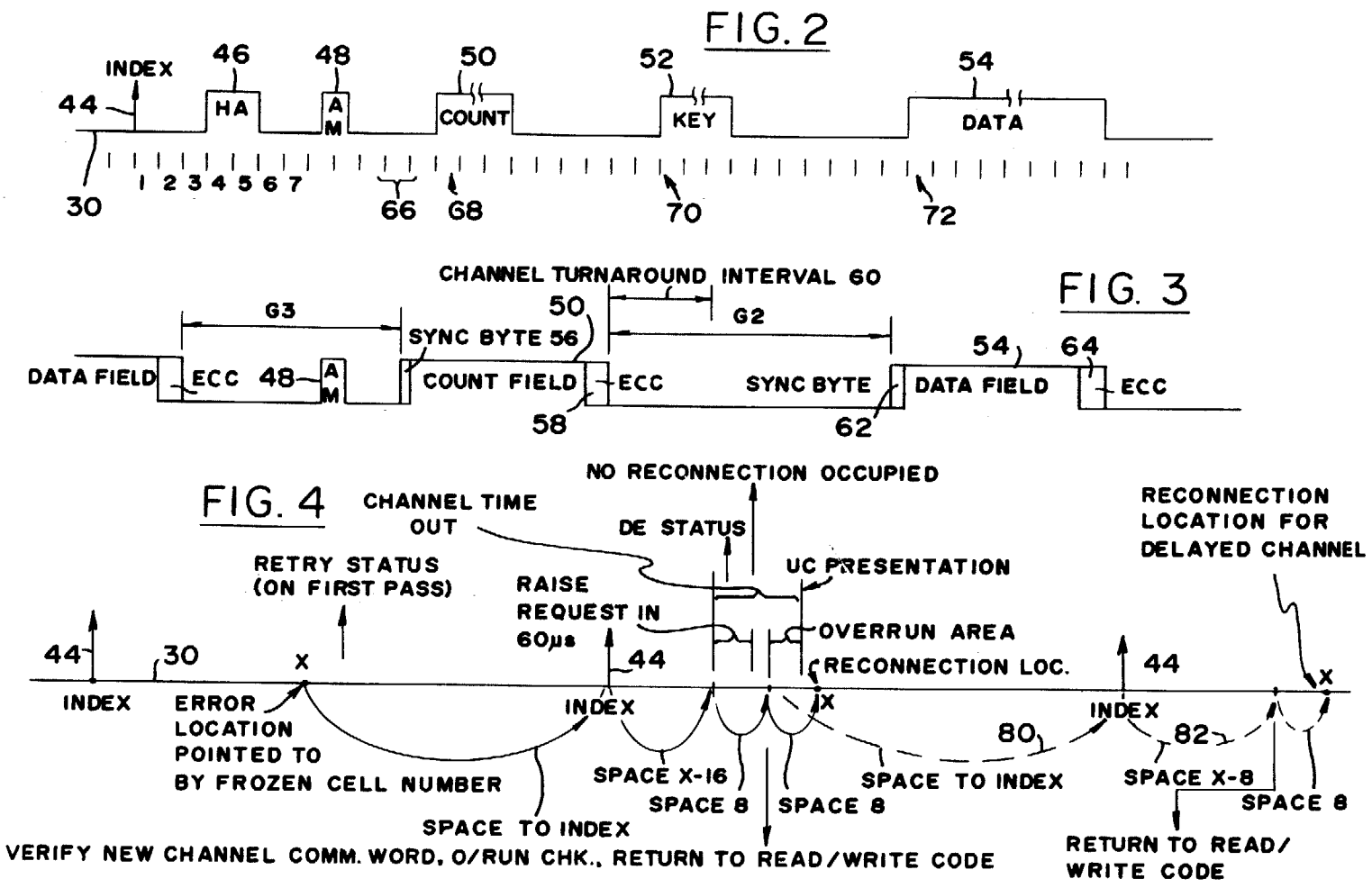
FIG. 2
INDEX
44
30
46
HA
48
A M
1 2 3 4 5 6 7
50
COUNT
66
68
52
KEY
70
54
DATA
72
FIG. 3
CHANNEL TURNAROUND INTERVAL 60
G2
G3
50
SYNC BYTE 56
COUNT FIELD
58
ECC
48
A M
DATA FIELD
SYNC BYTE
62
54
DATA FIELD
64
ECC
FIG. 4
CHANNEL TIME OUT
RETRY STATUS (ON FIRST PASS)
NO RECONNECTION OCCUPIED
DE STATUS
UC PRESENTATION
RAISE REQUEST IN 60μs
OVERRUN AREA
RECONNECTION LOC.
RECONNECTION LOCATION FOR DELAYED CHANNEL
ERROR LOCATION POINTED TO BY FROZEN CELL NUMBER
SPACE TO INDEX
SPACE X-16
SPACE 8
SPACE TO INDEX
SPACE X-8
SPACE 8
RETURN TO READ/WRITE CODE
VERIFY NEW CHANNEL COMM. WORD, O/RUN CHK., RETURN TO READ/WRITE CODE
80
82
X
30
44

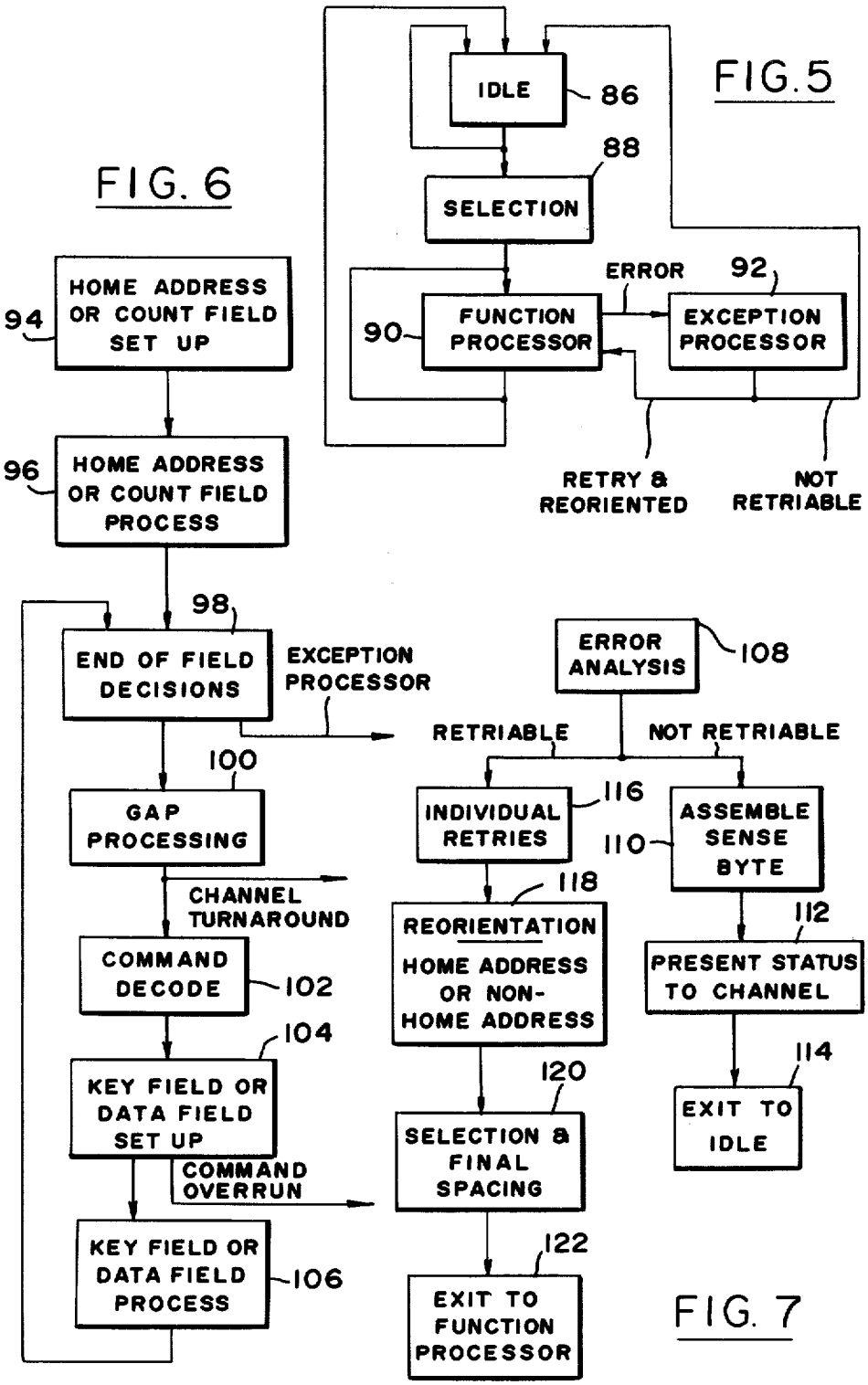
FIG. 5
IDLE
86
88
SELECTION
ERROR
92
90
FUNCTION PROCESSOR
EXCEPTION PROCESSOR
RETRY & REORIENTED
NOT RETRIABLE
FIG. 6
94
HOME ADDRESS OR COUNT FIELD SET UP
96
HOME ADDRESS OR COUNT FIELD PROCESS
98
END OF FIELD DECISIONS
EXCEPTION PROCESSOR
100
GAP PROCESSING
CHANNEL TURNAROUND
COMMAND DECODE
102
104
KEY FIELD OR DATA FIELD SET UP
COMMAND OVERRUN
KEY FIELD OR DATA FIELD PROCESS
106
ERROR ANALYSIS
108
RETRIABLE
NOT RETRIABLE
116
INDIVIDUAL RETRIES
110
ASSEMBLE SENSE BYTE
118
REORIENTATION
HOME ADDRESS OR NON-HOME ADDRESS
112
PRESENT STATUS TO CHANNEL
114
EXIT TO IDLE
120
SELECTION & FINAL SPACING
122
EXIT TO FUNCTION PROCESSOR
FIG. 7

APPARATUS AND METHOD FOR RECORD REORIENTATION FOLLOWING ERROR DETECTION IN A DATA STORAGE SUBSYSTEM

Matter enclosed in heavy brackets [ ] appears in the original patent but forms no part of this reissue specification; matter printed in italics indicates the additions made by reissue.

TECHNICAL FIELD

The present invention relates to data storage subsystems used in data processing systems, and more particularly to methods and apparatus for detecting retriable errors and thereafter establishing exact record reorientation in cyclically repeating data tracks such as are contained in a magnetic disk file or similar subsystem storage device.

BACKGROUND ART

In data processing systems a data storage device such as a magnetic disk file is frequently coupled via a channel to a central processing unit (CPU) to provide stored data to and to receive for storage data from the CPU. In a common system of this type the disk file is coupled to the channel through a controller and a director. The director responds to channel command words (CCWs) communicated over the channel from the CPU by temporarily storing and communicating data and by issuing commands to the controller. The commands control storage and communication of data within the controller and effect desired operations within the magnetic disk file. The director, controller and disk file together comprise a subsystem of the data processing system with its included CPU and channel.

Cyclic storage devices such as those employing magnetic disks or drums include one or more transducers, each of which is capable of addressing one or more essentially endless tracks which periodically repeat as a result of relative motion of the disk, drum or other storage medium relative to the transducer. Each track is typically organized so as to comprise a succession of sectors along the length thereof. A sector which includes one and sometimes two records is headed by a three byte address marker which identifies the beginning of the sector. Each record is begun by a count field headed by a sync byte, ending with several bytes of error correction code (ECC) and including a series of bytes therebetween which identify the record location in terms of disk and track or cylinder. The count field within each record is sometimes followed by a key field containing user data and like information and which is spaced apart from the count field by a short gap. Finally, each record contains a data field downstream of the count field and the key field where present. The data field begins with a sync byte, ends with ECC bytes and has various bytes of data therebetween.

As a transducer moves along a track so as to address successive ones of the records in conjunction with execution of various channel command words, orientation of the transducer to the desired records is maintained by processing the data comprising the beginning of each record in a selected way. First of all, the address marker is located. Following that, the sync byte at the beginning of the count field is located. Upon location of the sync byte, the controller sends the count field to the director which compares portions of the data thereof with channel data. At the end of transfer the controller provides certain ending conditions indicating such things as whether the count field was sent in timely fashion for the comparison and whether an error was detected in the count field. Thereafter, the transducer continues through the key field if one is present and then the data field by locating the sync byte at the beginning of each field, reading or writing the various bytes within the field and then noting the ECC bytes at the end of the field.

As the transducer moves relative to the track and the system executes various channel command words, errors are occasionally detected. The detected errors may be of different types and include those in which the data read from a particular field is determined to be in error and those in which for reasons of timing data from a given field could not be read, compared or otherwise processed in time to provide complete execution of the channel command word. As errors occur they may be classified in terms of whether they are retriable or not. If they are retriable the subsystem is typically upcoupled from the channel shortly after detection of the error and is then again coupled to the channel during the next occurrence of the error location in the cyclic movement of the track relative to the transducer in an attempt to reorient and successfully execute the channel command.

Where a retriable error consists of data from a field which is timely read but determined to be in error the error correction code (ECC) or other measures may be employed during the next revolution in an attempt to correct the error upon reorientation. In other instances, retriable errors result from the inability of the subsystem to detect a particular byte of groups or bytes or to timely compare or transfer a group of bytes. A common error of this type, referred to as Command Overrun, occurs when the subsystem is unable to timely complete the execution of a channel command word. Thus, a typical Command Overrun may occur where the subsystem is unable to transfer a count field to the director so that a successful comparison with channel data can be timely made. When such a condition occurs data transfer is not begun. Instead the subsystem attempts to reorient and achieve a successful comparison. Another common type of error which may occur prior to data transfer is when a sync byte is not detected. This condition is commonly referred to as Sync Byte Missing. Common retriable errors which occur during data transfer include Data Overrun and Data Check. Data Overrun typically occurs where reading or writing of data within a given field cannot be completed in time. Data Check is an error condition usually detected at the end of data transfer.

One successful scheme for providing reorientation in response to retriable errors in a data storage subsystem is described in U.S. Pat. No. 3,725,861 of Hancock, issued Apr. 3, 1973 and commonly assigned with the present application. In the Hancock arrangement sectors along each track are successively numbered such that the sector number can be detected and temporarily stored as the count field of one or more records in the sector are processed. Upon detection of an error the sector number identifying the sector containing the error is saved. The subsystem then advances to the next occurrence of the sector containing the error under the control of a one revolution counter. The particular location of the error within the sector is then determined using a phase locked oscillator which creates a timing window.

The arrangement described in Hancock operates in accurate and successful fashion for most applications thereof. However, there are certain applications or situations in which problems may arise. One such problem stems from the length of the sectors. While most sectors typically include only one record, some may include two records. Complex apparatus may therefore be required to more accurately identify the exact location of an error to prevent the subsystem from erroneously reorienting to the wrong record within a noted sector. A more serious problem, known as "nested error", may occur in situations where the detected error occurs in the latter part of a record such as in the data field and upon reorientation to the beginning of the record a different error is detected before the original error is reached. For example, if an error is detected in the data field of a given record, the sector number of the count field of this given record is stored and the subsystem is reoriented to the beginning of the sector. If the subsystem then detects a different error in the address marker or the count field which results in a Command Overrun, a Data Overrun or the like, the later error must be corrected before the subsystem can advance to the data field where the earlier error was detected. Another serious problem may arise such as where at the conclusion of processing a count field it is determined that there is a Command Overrun or a Sync Byte Missing prior to detection of the sync byte at the beginning of the next field. Because the Hancock arrangement records the sector number at the sync byte of a count field, the number of the sector being recorded may be that where the previous count field resides instead of the number of the sector encompassing the field in which the error occurred. The subsystem then reorients to the count field of a record prior to the one in which the error occurred. This problem is even further complicated if a different error is detected before again detecting the original error.

DISCLOSURE OF INVENTION

[Subsystems in accordance with the invention reorient to the exact field where an error was detected by determining and saving a beginning cell number for the field upon detection of an error within the field. Each]

*The nested error problem and others above-described are eliminated by use of the apparatus and method embodying the invention. It takes advantage of a count-key-data (CKD) format, heretofore proposed, in which each* track is divided into a succession of cells of equal length which are consecutively numbered from an index point. The various fields are recorded within the track so that their beginning and ending boundaries coincide with cell boundaries. *In other words, the distance between successive cell boundaries is related to the length of a field such that no two fields will start within the same cell.* As the transducer enters each new field the number of the cell at the beginning of the field is noted[, and is thereafter saved if an error is detected in the field].

*In accordance with the invention, the subsystem is reoriented to the exact field where an error was detected by determining and saving a beginning cell number for the field upon detection of an error within the field.* Upon detection of an error and subsequent uncoupling from the channel, the subsystem allows the transducer to advance past the index point to a cell which is upstream by a selected number of cells from the cell the number of which was temporarily stored upon detection of the error. The subsystem then looks to the channel for a command indicating that reorientation should occur. If such a command is received within a predetermined time interval defined by advancement of the transducer through a selected number of cells, the subsystem is reconnected to the channel and reorientation occurs as the transducer reaches the cell the number of which was stored. If such a command is received after termination of the predetermined time interval, the subsystem reconnects to the channel and advances the transducer through the error location to the index point and then to a cell upstream of the cell the number of which was stored. If a command dictating reorientation is not received by the subsystem, the subsystem advances to the index point and to the predetermined time interval before the stored cell number and repeats the process of waiting for the channel command again.

BRIEF DESCRIPTION OF DRAWINGS

The invention may be better understood by referring to the best mode for carrying out the invention and its industrial applicability, taken in conjunction with the accompanying drawings, in which:

FIG. 2 is a diagrammatic plot along a portion of the length of a data track of the various fields of a typical record;

FIG. 3 is a diagrammatic plot along a portion of the length of a data track of certain of the fields of FIG. 2 illustrating the manner in which the subsystem addresses and responds to the fields in accordance with the invention;

FIG. 4 is a diagram representing several revolutions of a data track and illustrating the various alternative steps of effecting reorientation;

FIG. 5 is a generalized block diagram of the different processing codes of the subsystem of FIG. 1;

FIG. 6 is a detailed block diagram of the successive steps of the function processor code of FIG. 5;

FIG. 7 is a detailed block diagram of the successive steps of the exception processor code of FIG. 5;

BEST MODE FOR CARRYING OUT THE INVENTION, AND INDUSTRIAL APPLICABILITY

Figure 1:
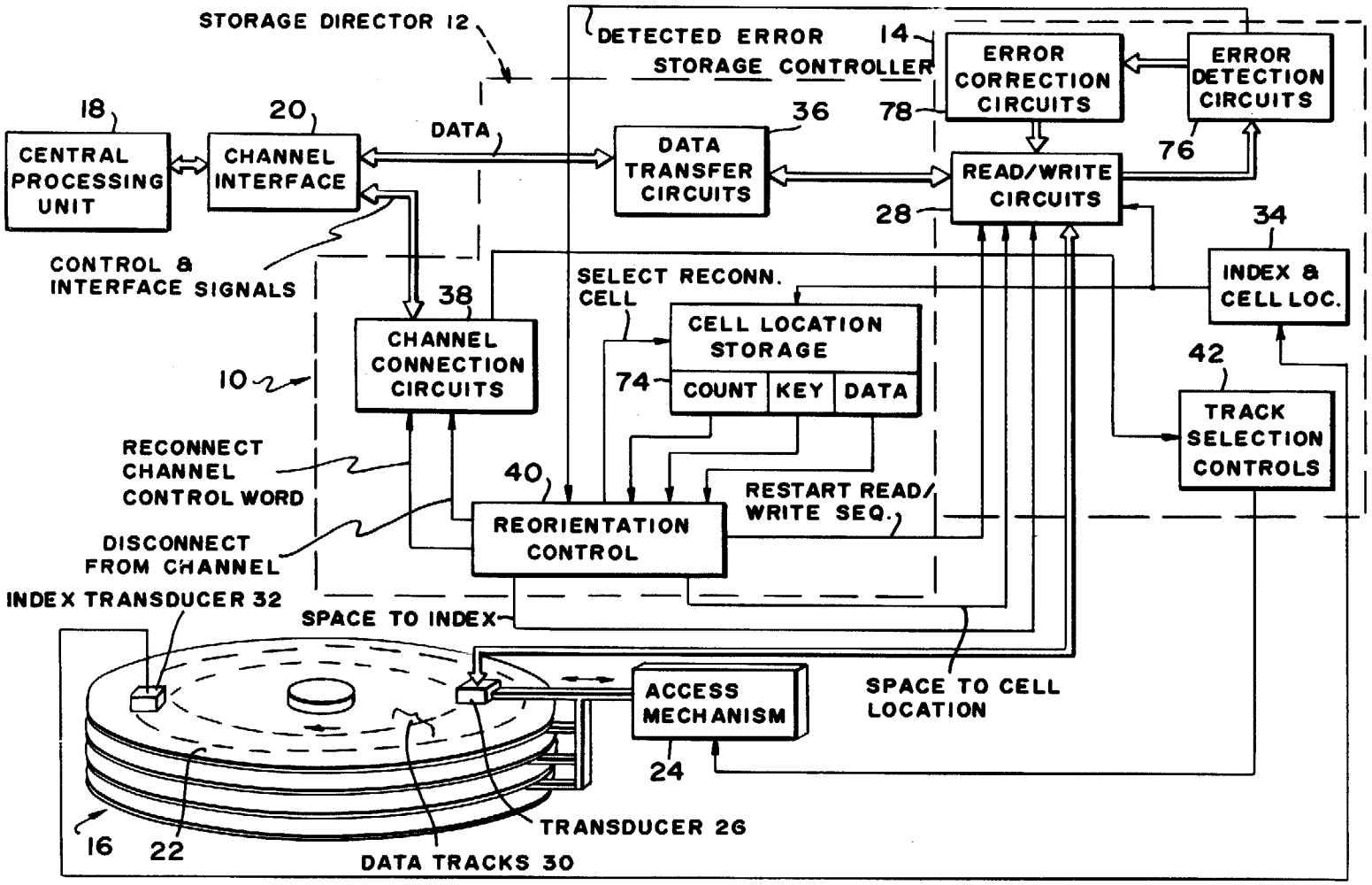
FIG. 1 is a block diagram of a preferred arrangement of a subsystem in accordance with the invention for effecting record reorientation following error detection.

FIG. 1 is a block diagram of a preferred arrangement of a subsystem in accordance with the invention. The subsystem 10 of FIG. 1 includes a storage director 12, a storage controller 14 and a magnetic disk file 16. The storage director 12 which is coupled to a central processing unit 18 through a channel interface 20 receives and decodes channel command words from the central processing unit 18 in addition to temporarily storing and transmitting certain data. The director 12 generates commands in response to the decoded channel command words and provides the command to the storage controller 14. The controller 14 which is also capable of temporarily storing and transmitting data translates the commands from the director 12 into read, write or repositioning operations at the magnetic disk file 16.

The particular magnetic disk file 16 shown in the arrangement of FIG. 1 includes four different magnetic disks with only the top disk 22 being shown in its entirety for reasons of clarity. An access mechanism 24 responds to signals from the controller 14 to laterally position a plurality of magnetic transducers relative to the magnetic disks. The transducers include a transducer 26 positioned adjacent the top surface of the top magnetic disk 22. Each of the transducers including the transducer 26 is coupled to read/write circuits 28 within the storage controller 14 to receive data to be recorded on the disks and to provide data read from the disks by the transducers to the controller 14.

As is well known in the art, one of the disks of the magnetic disk file 16 comprises a servo disk and has a plurality of tracks thereon having pulse trains recorded along the lengths thereof to provide timing information. The time lengths between pulses are equal and correspond to an 8 byte time interval. As described hereafer the pulses in the servo tracks define cells of equal time-length which determine where the leading and trailing edges of the various fields are to be located and which provide a convenient and accurate reference for reorienting upon detection of a retriable error.

Each of the magnetic disks including the disk 22 is provided with a plurality of data tracks 30 on the surface thereof. Each data track 30 is of circular, endless configuration such that it cyclically repeats itself when addressed by one of the transducers. Each magnetic disk is provided with a separate index transducer 32 (only one of which is shown in FIG. 1 for simplicity of illustration) for repetitively sensing the occurrence of an index mark recorded on an adjacent one of the tracks 30. The index mark presents itself to the index transducer 32 so as to provide a convenient reference to an index and cell location circuit 34 within the controller 14 upon each revolution of the magnetic disks.

The magnetic disk file 16 is shown and described herein for purposes of illustration only, and it will be understood by those skilled in the art that other forms of data storage devices that have repeating data tracks such as magnetic drums can also be used in the arrangement of FIG. 1.

The storage director 12 transfers data between the storage controller 14 and the channel interface 20 by data transfer circuits 36. The storage director 12 also includes channel connection circuits 38 for communicating control and interface signals between the director 12 and the channel interface 20. The channel connection circuits 38 control the unconnecting and reconnecting of the storage director 12 to the channel interface 20 in response to signals from a reorientation control circuit 40. In addition, the channel connection circuits 38 are coupled to track selection controls 42 within the storage controller 14. The track selection controls 42 are coupled to the access mechanism 24 to control positioning of the magnetic transducers at selected data tracks on the magnetic disks in response to signals from the channel connection circuits 38.

Each of the data tracks 30 on the magnetic disks is comprised of a succession of records disposed along the length thereof and headed by an index mark. FIG. 2 depicts a portion of a typical data track 30 including the index mark 44, a home address (HA) 46, an address marker (AM) 48, and a first record which includes a count field 50, a key field 52 and a data field 54. The following portions of the data track 30 consists of a succession of additional records, each of which is headed by address marker which is followed by a count field and a data field and in some instances a key field between the count and data fields.

The arrangement of the data track 30 as shown in FIG. 2 is a conventional one. The index mark 44 provides a convenient record for each revolution of the magnetic disk and thus each reoccurrence of the data track 30 at the addressing magnetic transducer. The home address 46 which closely follows the index mark 44 helps to identify the track. The address marker 48 is a signal of three bytes duration marking the beginning of the record which includes the count field 50, the key field 52 and the data field 54. The count field 50 identifies the location of the record in terms of the location of the track and disk or "cylinder" within the magnetic disk file 16 and the location of the record within the track 30. The key field 52 which is present in some but not all records contains such things as customer data. The data field 54 contains the data of interest within the record and is typically much greater in length than the count field 50 or the key field 52. Although not shown in FIG. 2 the data field 54 would be followed by the address marker of the following record, and then the count, then key and then data fields of the following record. As described hereafter in connection with FIG. 3 each of the fields 50, 52 and 54 is headed by a sync byte one byte in length providing a convenient reference in the form of a indication to the magnetic transducer that the beginning of a field is occurring. As also described hereafter in connection with FIG. 3 each of the fields 50, 52 and 54 terminates in a three byte long error correction code (ECC). The error correction code when communicated to the storage controller 14 can be used to correct errors in data in the field.

As previously noted the storage director 12 decodes channel command words received from the central processing unit 18 via the channel interface 20 and in turn provides commands to the storage controller 14 to control data transfer to and from the magnetic disk file 16. The central processing unit 18 continually monitors the status of the subsystem 10 and send channel command words in accordance with the status to effect desired data processing operations within the subsystem 10. For example, when it is desired to position a magnetic transducer such as the transducer 26 at a particular one of the data tracks 30 a "Seek" channel command word is provided to the director 12. The channel connection circuits 38 within the director 12 respond by decoding the "Seek" channel command word and providing appropriate commands to the track selection controls 42 within the storage controller 14 to cause the access mechanism 24 to position the transducer 26 at the desired data track 30. No reading or writing occurs during the "Seek" channel command word, and therefore the data transfer circuits 36 within the director 12 and the read/write circuits 28 within the controller 14 are inactive.

With the transducer 26 positioned at a desired data track 30 the next channel command word might typically be a "Search ID" word indicating that the transducer 26 is to locate a particular record within the data track 30. The transducer 26 under the control of the controller 14 locates the next address marker and then the sync byte at the beginning of the following count field, at which point the count field as read by the transducer 26 is temporarily stored in the data transfer circuits 36 within the director 12. The count field is then compared with data presented by the channel interface 20. If the compared data are equal, the desired record has been found, and a further channel command word is issued to effect reading, writing or another desired operation within the record. If the data temporarily stored in the data transfer circuits 36 does not compare with the data presented by the channel interface 20, the transducer 26 is instructed by the controller 14 to skip through the remaining portions of the record including the data field. In the meantime a new "Search ID" channel command word is presented, and the process is repeated by detecting the address marker and count field sync byte and then comparing the count field in the next record. This procedure is typically repeated until the desired record is found within the data track 30 or until a different channel command word is presented. When the desired record is located as indicated by a favorable comparison of the count field, a "Read Data" channel command word is typically provided so that the following data field within the desired record is read.

During execution of a "Search ID" channel command, it sometimes happens that the count field cannot be compared with the data presented by the channel interface 20 in time to determine the results of the comparison as the end of the count field is reached and the following gap is entered. This results in the storage director 12 indicating a "Command Overrun" condition. A Command Overrun condition is a retriable type of error in that the error may be usually recovered by reorienting to the same count field on the next revolution and again attempting to effect a comparison of the count field with the data presented by the channel interface 20 in timely fashion. A "Command Overrun" condition can occur in other situations such as where channel turnaround cannot be completed on time. As illustrated in FIG. 3 the count field 50 which is begun with a sync byte 56 and ended with three bytes of error correction code 58 is followed by a G2 gap which precedes the occurrence of the following data field 54. Each count field such as the count field 50 is separated from the data field of the preceding record by a G3 gap which includes the address marker 48.

In the illustration of FIG. 3 the key field 52 has been eliminated for simplicity. The first portion of the G2 interval comprises a channel turnaround interval 60 of predetermined duration. If it is assumed that the comparison of the count field with the data presented by the channel interface 20 is completed and the G2 gap is entered into commencing the channel turnaround interval 60 the subsystem then examines the next channel command word. If a new channel command word cannot be ascertained within the interval 60 so that the subsystem can prepare for further processing within the gap G2 and the following data field 54, a "Command Overrun" condition is again signaled, indicating that a retriable error has occurred and that the magnetic transducer should be advanced through one revolution of the data track so as to again locate the count field and then search for a channel command word within the following channel turnaround interval 60.

Other retriable error conditions may occur such as where the subsystem fails to detect a sync byte at the beginning of a field. As shown in FIG. 3 the count field 50 is headed by the sync byte 56 and the data field 54 is headed by a sync byte 62. If the subsystem fails to detect a sync byte at the beginning of a field being scanned, a "Sync Byte Missing" condition is indicated by the read/write circuits 28 within the storage controller 14, dictating that a retry should be made.

A further type of retriable error condition known as "Data Overrun" may occur in situations where the count field 50 has been read and properly identified, a channel command word is presented during the following channel turnaround interval 60, the sync byte at the beginning of the data field is properly detected but the data within the data field cannot be communicated to the data transfer circuits 36 within the storage director 12 in time to be processed in accordance with the latest channel command word from the channel interface 20. In the event of a "Data Overrun" as signaled by the storage director 12, the subsystem should be reoriented to the same data field on the next revolution of the data track so that another attempt can be made to properly process the data from the data field.

A still further type of retriable error known as "Data Check" can occur as the consequence of the inability of the controller 14 which has detected an error in a field being read to correct the error using the ECC bytes at the end of the field. As shown in FIG. 3 the count field 50 terminates the ECC bytes 58 and the data field 54 terminates with three ECC bytes 64. Upon the occurrence of a Data Check condition, the system should be reoriented to the field where the error occurred upon the next revolution.

As shown in FIG. 2 *and proposed prior to this invention to prevent positional tolerance accumulations,* each data track 30 is divided into a plurality of cells 66 of equal length. The cells 66 begin at the index mark 44 and advance along the entire length of the track so as to terminate back at the index mark 44. The cell 66 are consecutively numbered beginning with the index mark 44 so that different cell numbers for a given track and for particular fields within the records of the track can be stored and processed by the storage director 12 and the storage controller 14. The home address 46 and the various fields throughout the track such as the count field 50, the key field 52 and the data field 54 are recorded in such a way that the beginning and ending boundaries thereof coincide with cell boundaries. Each field is filled in or padded as necessary so that the boundaries coincide, using an appropriate technique such as that described in U.S. Pat. No. 3,629,860 of A. J. Capozzi, commonly assigned with the present application. [The] *In accordance with the present invention, the* cell number at the beginning of each field is recorded in a place where it can be identified and used to effect reorientation upon detection of a retriable error. As seen in FIG. 2 the count field 50 has a cell 68 at the beginning thereof. The number of the cell 68 is stored as a part of the data in the count field 50 when the count field 50 is recorded on the data track 30. In similar fashion the number of the cell at the beginning of each of the other count fields on the data track 30 is recorded as part of the data within the count field. The key field 52 has a cell 70 coincident with the beginning thereof, and the data field 54 has a cell 72 coincident with the beginning thereof. The numbers of the cells 70 and 72 are stored in a cell location storage circuit 74 shown in FIG. 1 which forms part of the storage director 12. In like fashion the numbers of the cells at the beginning of all other key and data fields within the data track 30 are stored in the cell location storage circuit 74.

The cell location storage circuit 74 which stores the number of the cells denoting the beginning of each key and data field within the various data tracks makes the various cell numbers available for use in the event a retriable error is detected within or immediately following a key or data field. As each count field is read, the data thereof which includes the beginning cell number is stored in the data transfer circuits 36 within the director 12 for comparison with channel presented data. At the same time the beginning cell number is temporarily stored in the cell location storage circuit 74 where it may be frozen for later use in the event a retriable error is detected.

In the present example the boundaries and numbers of the various cells 66 are not actually recorded in the data tracks 30 but instead occur as timing signals provided to the controller 14 from the pulses recorded along the length of a corresponding track on the servo disk. The cells are conventionally chosen to be 32 bytes in length so that 4 of the 8 byte-long pulses from a servo track are necessary to define one cell. The cell numbers are determined by the cell location storage circuit 72 from the cell numbers stored as part of each home address and each count field.

When a track or portion thereof is being recorded on one of the magnetic disks, the storage director 12 provides data to the controller 14 in 32 byte groups together with commands for the recordation thereof in synchronism with the cell boundaries as defined by every fourth pulse from the servo disk. The timing is such that upon the occurrence of each pulse defining a cell boundary, the next 32 byte group of data is recorded. In composing the 32 byte groups of data the director 12 pads as necessary so that the beginning and the end of each field coincide with cell boundaries. The director 12 keeps track of cell numbers by counting cells as they occur and recording the leading edge cell number of each home address as a part of the home address and recording the leading edge cell number of each count field as part of the count field. Thereafter, as the tracks are read the cell location storage circuit 74 temporarily stores the cell number carried by each home address as the home address is read and compared by the director 12 with data from the channel interface 20. If an error is detected in the home address the leading edge cell number therefore is frozen in the cell location storge circuit 74. Similarly, as each count field is read and compared with channel data, the leading edge cell number therein is temporarily stored in the cell location storage circuit 74 where it can be saved in the event an error is detected. Although the leading edge cell numbers for the key and data fields are not stored as part of the fields, they are readily determined and saved by the cell location storage circuit 74 in the event an error is detected by keeping a record of the number of cells that occur following each home address or count field cell number which is temporarily stored in the cell location storage circuit 74.

Upon the occurrence of a retriable error such as a Command Overrun or a Data Overrun, such condition is noted by error detection circuits 76 coupled to the read/write circuits 28 within the storage controller 14. The error detection circuits 76 provide a detected error signal to the reorientation control circuit 40 within the storage director 12. The reorientation control circuit 40 in turn provides a signal to the channel connection circuits 38 which results in the director 12 and the remainder of the subsystem 10 being disconnected from the channel interface 20 pending evaluation of the error and attempting to reorient on the next or subsequent cycles of the data track. The error detection circuits 76 are also coupled to the read/write circuits 28 through error correction circuits 78. In cases where the error occurs in the data being read in a given field, the error correction bits at the end of the field may be applied to the error correction circuits 78 in an attempt to correct the data by the end of the next or subsequent revolutions of the data track. Such operation may be as described in U.S. Pat. No. 3,622,984 of H. P. Eastman, commonly assigned with the present application.

After determining and saving the beginning field cell number in the cell location storage circuits 74 and uncoupling the subsystem from the channel interface 20 by means of the channel connection circuits 38 upon detection of an error, the reorientation control circuit 40 issues a space-to-index command to the read/write circuits 28 of the controller 14 so as to advance the magnetic transducer from the location of the error to the next occurrence of the index mark at the transducer. The occurrence of the index mark at the transducer 26 is determined by the index transducer 32 in conjunction with the index and cell location circuit 34. When the index point is reached, the reorientation control circuit 40 issues a space-to-cell location command to the read/write circuits 28 of the controller 14. This causes the controller 14 to advance the transducer from the index mark to a cell located upstream from the cell number frozen in the cell location storage circuit 74 by a predetermined first number of cells (16 cells in the present example). The relocation of the magnetic transducer to a location 16 cells upstream of the beginning cell for the field in which the error occurred allows the subsystem to look for a channel command word from the channel interface 20 instructing a retry and to reconnect the subsystem to the channel interface in the event such a channel command word is received. The reorientation control circuit 40 causes the magnetic transducer to advance downstream to a location which is upstream of the frozen cell number by a second selected number of cells (8 cells in the present example) while requesting a channel command word from the channel interface 20 which dictates that the error be retried. If such a channel command word is received within a fixed time interval, the reorientation control circuit 40 causes the channel connection circuits 38 to reconnect the subsystem 10 to the channel interface 20 and reorient to the location where the error occurred. If a channel command word directing retry is received too late so as to fall outside of the time interval, the channel connection circuits 38 will reconnect the subsystem 10 to the channel interface 20 and the reorientation control circuit 40 responds by issuing a space-to-index command to advance the magnetic transducer to the index mark. Upon reaching the index mark the reorientation control circuit 40 issues a space-to-cell location command which causes the transducer to advance to a point upstream of the frozen cell number and to the location where the error occurred. If a channel command word dictating retry is not received within a predetermined time period following the selected time interval, the reorientation control circuit repeats the reorientation procedure by issuing a space-to-index command. When the subsystem advances the magnetic transducer to the index mark, a space-to-index location command is issued to move the transducer to a predetermined cell upstream of the frozen cell number, at which point the storage director awaits the next channel command word again.

The various reorientation operations just described can be better understood by referring to FIG. 4 which depicts several revolutions of the data track 30. It is assumed that an error has occurred within or immediately following a field the beginning cell number for which is X. The cell number X is frozen in the cell storage location circuit 74 and the space-to-index command issued by the orientation control circuit 40 causes the magnetic transducer to space to the next occurrence of the index mark 44. The reorientation control circuit 40 then issues a space-to-cell location command which causes the magnetic transducer to space to cell number X−16. At X−16 a 60 microsecond time interval is begun during which time a channel command word dictating a retry is looked for. At the same time the reorientation control circuit 40 issues a space 8 cells command so as to advance the magnetic transducer to cell number X−8. If a channel command word dictating retry is received within the 60 microsecond time interval, the reorientation control circuit 40 issues a command to space 8 cells to the X cell, and at the same time the channel connection circuits 38 are prepared to reconnect the subsystem 10 to the channel interface 20 as cell X is reached. When cell X is reached the subsystem has reoriented to the error location where a retry is effected. If a channel command word dictating retry is achieved within a 20 microsecond interval following the 60 microsecond time interval, the reorientation control circuit 40 issues another space-to-index command causing the magnetic transducer to space to the next occurrence of the index mark 44 as shown by a dashed line 80 in FIG. 4. Upon reaching the index mark 44 the reorientation control circuit 40 issues a command causing the transducer to be spaced to cell number X−8 as shown by the dashed line 82 in FIG. 4. Since a channel command word dictating retry was received during the prior revolution and channel connection has been established, the transducer may be advanced to X−8 instead of X−16. Upon reaching cell number X−8, the reorientation control circuit 40 issues a command to space 8 cells to the X cell.

If upon detecting the error and freezing cell number X, then spacing to the index mark 44 and then spacing to X−16, a channel command word dictating retry is not received either within the 60 microsecond time interval or the following 20 microsecond interval, the reorientation control circuit 40 issues a space-to-index command causing the magnetic transducer to be advanced to the next occurrence of the index mark 44 as shown by a line 84 where the subsystem attempts reorientation and reconnection again.

It will be seen that systems in accordance with the invention avoid many problems present in prior art systems by always reorienting to the field where the error occurred. This avoids the problem of reorienting to the wrong record such as where reorientation is based on sector number. It furthermore avoids the nested error problem present in many prior art arrangements by eliminating the possibility of detecting a subsequent error upon reorientation to a location just upstream of the location where the original error occurred. Systems of the invention still further avoid the problems which arise in those prior art systems that sometimes erroneously record the prior sector number as the site of the error simply because a sync byte within the sector where the error took place is missing and such sector number is therefore not frozen.

Various portions of the storage director 12 and the storage controller 14 shown in FIG. 1 can be implemented using conventional control units employing an appropriate microcode. Control units of this type are well known and examples thereof are provided by U.S. Pat. No. 3,544,966 of J. J. Harmon and U.S. Pat. No. 3,623,022 of R. C. Day, both of which are commonly assigned with the present application. The Harmon patent described a microprogrammed control unit subsystem with a read only storage. The Day patent describes a microprogrammed storage control unit subsystem having a writable control storage unit. A block diagram of an appropriate basic arrangement of microcodes for use with such control units so as to implement the invention is shown in FIG. 5. When in an "idle" code represented by a block 86 the storage controller 14 idles in preparation for a command from the director 12. The code may change to a selection code 88 upon selection of the subsystem to execute one or more channel command words. When a selection by the channel interface dictates execution of a particular channel command word, a function processor code 90 is used. The subsystem uses the function processor code 90 so as to execute the channel command word until execution of the channel command word is completed, whereupon the subsystem reverts to the idle code 86. If an error is encountered during execution of the channel command word, the subsystem switches to an exception processor code 92. While using the exception processor code 92 the subsystem determines whether the error is retriable or not retriable. If the error is not retriable the subsystem reverts to the idle code 86 where it awaits the next command. If the error is determined to be retriable, the subsystem continues to use the exception processor code 92 long enough to achieve reorientation and reconnection of the subsystem to the channel, at which point the function processor code 90 is again restored to.

FIG. 6 is a block diagram depicting the successive steps of the function processor code 90 of FIG. 5. In a first such step 94 the subsystem is set up to read or write a home address or a count field. This is accomplished by providing a command from the director 12 to the controller 14. In the next step 96 the home address or the count field is actually processed. In the case of a count field, the field is read and transferred to the director 12 for comparison with channel data. In the next step 98 certain end-of-field decisions are made. If an error has been detected the exception processor code 92 is entered. If all the operations required by the current channel command have been completed, channel turnaround may take place at the beginning of the gap following the field. In the absence of exception processing the next step 100 of gap processing is performed. The subsystem checks for any defects in the gap, and is spaced or padded to the next field in preparation for processing of the next field. Returning from channel turnaround, during the following command decode step 102 the director 12 decodes a new channel command word from the channel interface 20 and issues commands to the controller 14. During the next step 104 the subsystem is set up to process the key field or the data field of the record. If the set up cannot be accomplished in time a Command Overrun is indicated and the subsystem changes to the exception processor code 92. Assuming the subsystem can be set up to process the key field or the data field, the field is next processed in the step 106. If the record has a key field, the key field is processed during the step 106 and the step 98 is again performed for end-of-field decisions following the key field. The steps 100, 102, 104, 106 and 98 are then repeated for the data field. After processing the data field and making in-the-field decisions the subsystem returns to step 94 in preparation for processing of the home address or the next count field.

The successive steps of the exception processor code 92 of FIG. 5 are shown in FIG. 7. When an error is detected such as in the end-of-field decisions step 98 of the function processor code 90 of FIG. 6 the subsystem changes to the exception processor code and a first step 108 of error analysis is performed. During this step the subsystem determines whether the error detected is retriable or not retriable. If the error is determined to be non-retriable the subsystem assembles the sense bytes during the next step 110. The sense bytes contain information regarding the error. In the next step 112 the status of the subsystem is presented to the channel such as by providing a "Unit Check" status to indicate detection of an error which is not retriable. The subsystem then exits to the idle code 86 shown in FIG. 5 during the next step 114 where it awaits the next command from the channel.

If the error analysis of step 108 results in a determination that the error is retriable then the next step 116 is to temporarily store information regarding the retriable error so that information on individual retries is available. The subsystem then attempts to reorient during the next step 118. If the error occurred in the home address the subsystem prepares to reorient to the home address. Otherwise, the subsystem prepares to reorient to the field the beginning cell number of which has been frozen. During the next step 120 the subsystem reorients by spacing the transducer based on such things as the timely receipt of a new channel command word dictating a retry. Upon reorientation, the subsystem exits to the function processor code 90 during the next step 122.

Figures 8, 10:
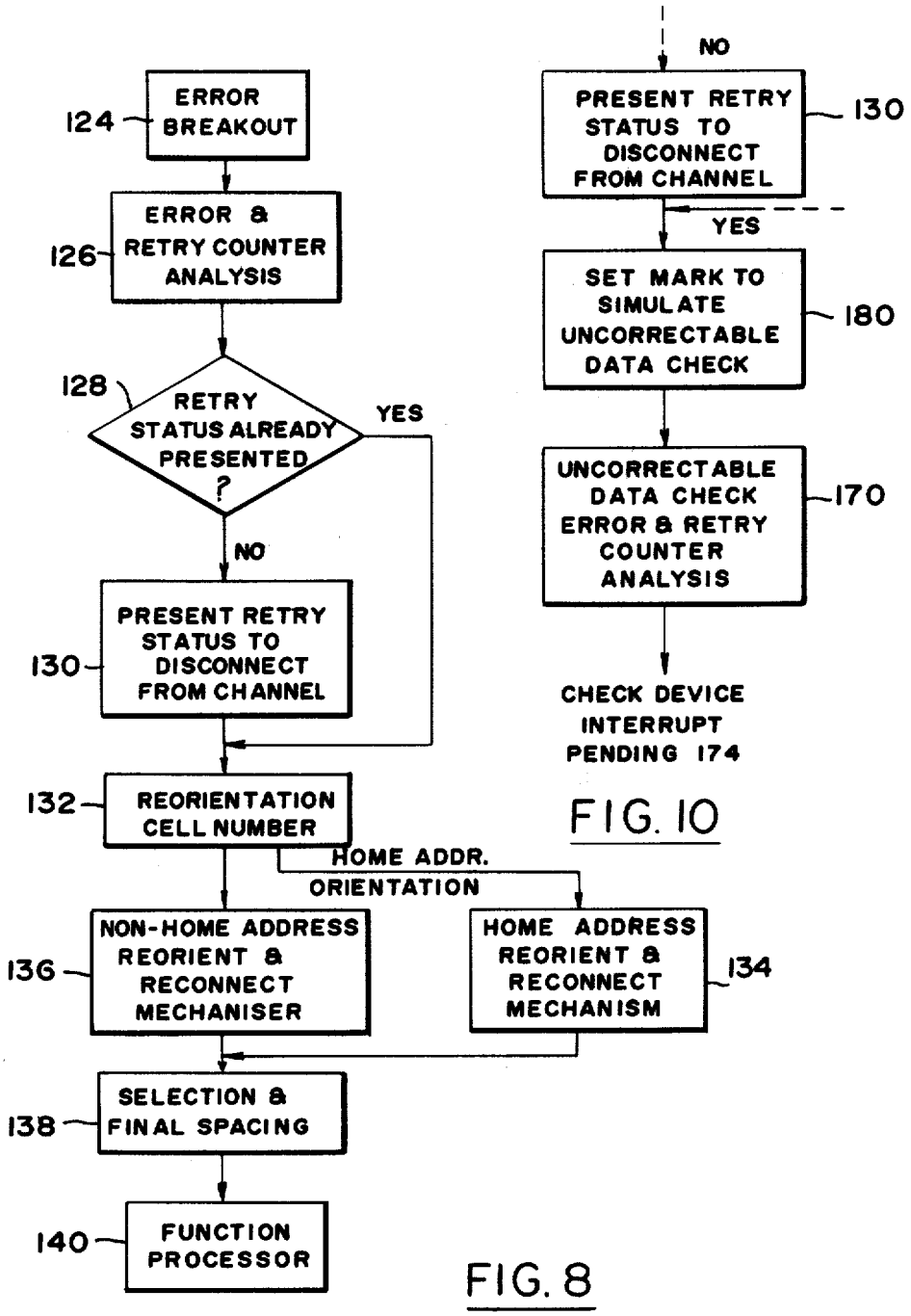
FIG. 8 is a detailed block diagram of the method of reorientation in accordance with the invention in the event of a Command Overrun.
FIG. 10 is a detailed block diagram of a portion of the method of reorientation in accordance with the invention in the event of a Data Overrun.

The exception processor code 92 of FIG. 7 depicts in relatively general fashion the steps that are carried out when a retriable error is detected. FIG. 8 depicts the successive steps in detail of a method in accordance with the invention for reorienting in response to a Command Overrun condition. In the first or error breakout step 124 the subsystem analyzes the error to determine if it is retriable. If the error is determined to be retriable, then during the next step 126 which involves error and retry counter analysis a counter keeping a record of the number of times different types of errors are encountered is incremented. During the next step 128 a decision is made as to whether the subsystem has already presented a retry status to the channel. If retry status has not been presented, then such status is presented to the channel and the subsystem disconnects from the channel during the next step 130. If in step 128 it is determined that the retry status has already been presented such as where the magnetic transducer was spaced past the index mark to cell number X−16 and a channel command word dictating retry was then received after the predetermined time interval so as to dictate again skipping past the index mark to cell number X−8, the step 130 is skipped. During the next step 132 the appropriate frozen cell number is examined and used to begin reorientation. If the error occurred within the home address so that reorientation is to occur there, then during the next step 134 reorientation to the home address is begun by reconnecting the subsystem to the channel 21 cells upstream of the index mark. This allows enough time and space to reorient to the home address which occurs just after the index mark. If reorientation is to other than the home address, then during the next step 136 commands are issued to space the transducer to the index mark, then to cell number X−16, then to cell number X−8 and the subsystem is reconnected to the channel. After performing step 134 or 136 the next step 138 is accomplished by spacing eight more cells to the point where actual reorientation occurs. During the next step 140 control is passed back to the function processor code 90.

Figure 9:
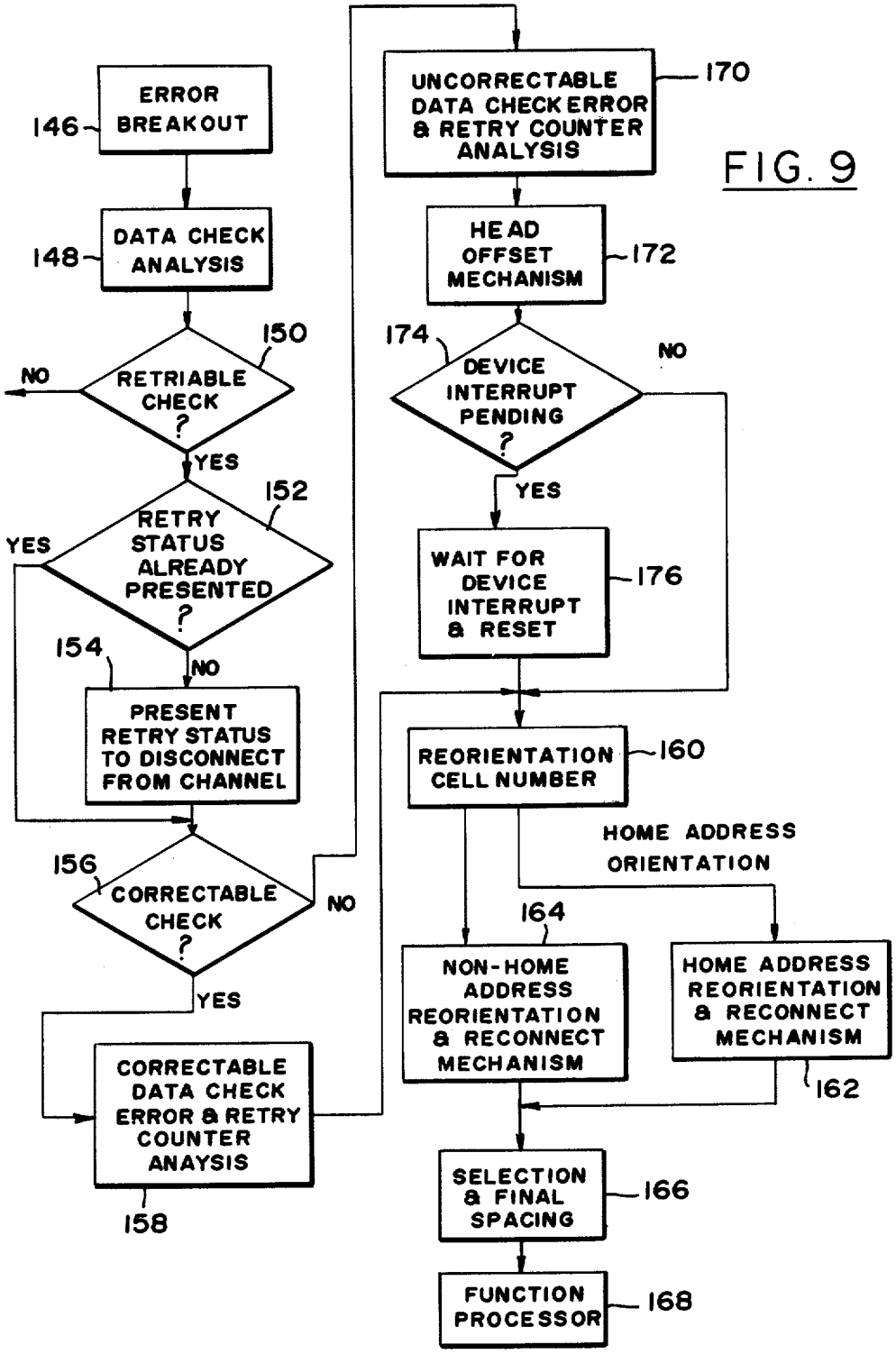
FIG. 9 is a detailed block diagram of the method or reorientation in accordance with the invention in the event of a Data Check.

FIG. 9 depicts the successive steps in a method in accordance with the invention of reorientation upon the occurrence of a Data Check condition. During a first step 146 the error is analyzed as to type and whether it is retriable. During a Data Check analysis comprising the next step 148 the error is again analyzed to determine if it is correctable or not. During the next step 150 the error is checked to determine if it is of the retriable type. If the error is determined to be not retriable it is handled separately from the rest of the method. If it is determined to be retriable, then the next step 152 and the following step 154 which correspond to the steps 128 and 130 respectively in the method of FIG. 8 involve the determination of whether a retry status has already been presented to the channel and the presentation of such status and the disconnecting from the channel if it has not. During the next step 156 the error is checked to determine if it is correctable.

If the check performed during step 156 determines that the error is correctable then a counter analysis is performed during a next step 158 to update counters keeping a record of the number of times the type of error has occurred and has been retried. The remaining steps 160, 162, 164, 166 and 168 correspond respectively to the steps 132, 134, 136, 138 and 140 in the method of FIG. 8. Thus, the frozen cell number is examined, the reorientation space commands are issued depending upon whether it is a home address or non-home address error, final spacing is carried out, reorientation is accomplished and the subsystem exits to the function processor code.

If the check performed in step 156 of the method of FIG. 9 determines that the error is not correctable, then during the next step 170 analysis of the error is performed and several counters are updated. One counter keeps a record of the number of times this particular Data Check has been retried. Another counter keeps a record of the number of times the uncorrectable Data Check has occurred. Following that, a head offset mechanism step 172 is employed in which the magnetic transducing head is moved slightly to see if this will correct the problem. During the following step 174 a decision is made as to whether a device interrupt is pending. Such interrupt is normally presented when the magnetic transducing head is finished seeking. If it is determined that a device interrupt is pending, then the interrupt is reset during the next step 176 prior to moving on to step 160. Otherwise the system moves on to step 160 and then sequences through the steps 162 or 164, then 166 and then 168.

FIG. 10 depicts a portion of a preferred method of reorientation in accordance with the invention when a Data Overrun condition occurs. The first three steps of the method of FIG. 10 correspond to the steps 124, 126 and 128 of FIG. 8 and have been eliminated from FIG.

10 for simplicity. After analyzing the error and determining whether a retry status has already been presented, the step 130 is performed so as to present the retry status and disconnect from the channel if the status has not already been presented. During the next step 180 an uncorrectable Data Check is simulated, and that is followed by the step 170 corresponding to the step 170 in FIG. 9 where counters are updated to keep a record of the number of occurrences of the data overrun and the number of retries. The remaining steps in the method of FIG. 10 correspond to the steps following the step 172 in the method of FIG. 9.

While the invention has been particularly shown and described with reference to a preferred embodiment thereof, it will be understood by those skilled in the art that various changes in form and details may be made therein without departing from the spirit and scope of the invention.

What is claimed is:

1. In a subsystem selectively attaching a channel interface and responsive to channel command words, said subsystem storing records on media in moving relation to a plurality of transducers, the records being written on cyclically readable paths, each path being subdivided into equal fixed length recording cells which are sequentially numbered past an index point on said path, the beginning of each field of each record coinciding with an initial cell for the field, the method of reorienting a selected transducer to the field of the record where a retriable error has occurred comprising the steps of:

ascertaining the initial cell number of each field while processing;

detecting retriable errors;

disconnecting the subsystem from the channel upon detection of a retriable error;

selecting a reorientation cell number from the initial cell number for the field in which the retriable error was detected as a function of the type of field, error and an original channel command word being executed;

moving the path relative to the selected transducer through the index point and until the transducer is positioned a predetermined distance before the reorientation cell;

reconnecting the subsystem to the channel and requesting repeat of the original channel command word; and moving the path relative to the selected transducer to the reorientation cell upon the condition that the original channel command word is repeated.

2. In a data storage subsystem that is selectively attached to a channel interface, and responsive to channel command words, said subsystem storing variable length records on cyclically movable media for reading and writing by any of a plurality of transducers, the records being written serially on tracks and each record including count and data fields and in some instances a key field, the fields being arranged serially and in predetermined order, in any of which fields an error may occur, the tracks being disposed relative to an index point, the method of reorienting a selected transducer to recommence data transfer at a location on a track proximate to where a retriable error has occurred, comprising the steps of:

subdividing the tracks into equal fixed length recording cells sequentially numbered past the index point;

detecting retriable errors as data transfer takes place;

determining and storing the initial cell number for the record in which the error occurred;

disconnecting the subsystem from the channel upon detection of the error;

correcting the portion of the record that was detected as in error, while disconnected;

selecting a reconnection cell number from the initial cell number for the record in which the error occurred as a function at least of the location of the error;

reconnecting the subsystem to the channel to reobtain the original channel command word;

completing a cyclic movement of the track relative to the selected transducer past the index point to a region ahead of the selected reconnection cell; and reestablishing reconnection of the subsystem to the channel at a time sufficiently prior to the reconnection cell location so that data transfer can initiate at the reconnection cell location beginning with the field at which the error occurred, so that corrected data may be transferred for the field in which the error occurred without the introduction of other error possibilities.

3. The method of reorienting a transducer to a location on a recorded moving track in which an error is identified by error detecting and correcting circuits, the track being one of a number of data tracks, each of which have serial variable length records, each including different fields, the method comprising the steps of:

monitoring the track position relative to the transducer by identifying equal length, successively numbered data cells comprising successive equal groups of bytes following an index point, as a data transfer try is effected;

detecting the existence of a retriable error;

determining the beginning data cell number for the last field in which data transfer was to take place, upon detecting the existence of a retriable error;

selecting a reconnection cell number for reorientation based upon the beginning data cell number determined and the error location;

attempting to reorient the transducer to the location on the track on which the error was detected on a second passage of the track so as to initiate data transfer beginning at the reconnection cell without the passage of the previously correctly read portion of the record; and correcting the error previously detected concurrently with the reorientation procedure.

4. The method as set forth in claim 3 above, wherein the data cell numbers that are determined include count field, key field and data field numbers, and wherein the step of selecting a reconnection cell number includes selecting the beginning cell number of one of each of said fields.

5. A method of reorienting a transducer within a cyclically repeating track having a succession of different *failure independent* fields recorded therein, different groups of the fields defining a succession of different records *each of which has a unique address independent of its physical location* along the track, comprising the steps of:

providing an indication of the location of each *failure independent* field relative to a common reference location on the track;

moving the transducer in a given direction along the track;

identifying the indication of the location of the last *failure independent* field presented to the transducer upon the occurrence of an error;

storing the identified indication;

terminating data processing at the transducer upon the occurrence of an error;

advancing the transducer relative to the track in the given direction past the common reference location [to] *and any failure independent fields in the record in error preceding* the *precise* field the indication of which was stored; and *only thereafter* attempting to continue data processing at the transducer.

6. A method of reorienting a transducer within a cyclically repeating track having a succession of different groups of [the] *failure independent* fields defining a succession of different records along the track, comprising the steps of:

providing an indication of the location of each *failure independent* field relative to a common reference location on the track;

identifying the indication of the location of the last *failure independent* field presented to the transducer upon the occurrence of an error;

terminating data processing at the transducer upon the occurrence of an error;

advancing the transducer relative to the track past the common reference location to the *precise failure independent* field the indication of which was identified; and attempting to continue data processing at the transducer, including the steps of seeking an external command to commence data processing before the transducer has advanced to the field the indication of which was identified, commencing data processing *only* when the transducer is advanced to the field the indication of which was identified if an external command to commence data processing is received early enough to permit data processing to commence as the transducer is advanced to the field the indication of which was identified, and again advancing the transducer relative to the track past the common reference location to the field the indication of which was identified and commencing data processing if an external command to commence data processing is received too late to permit data processing to commence as the transducer is advanced to the field the indication of which was identified.

7. In a system in which a data storage device responds to commands from a channel to carry out data processing operations, the data storage device including at least one transducer capable of addressing at least one cyclically repeating track which has a plurality of fields recorded therealong and is divided into a plurality of cells of equal time-length which are numbered consecutively from a common index point on the track, each field having a cell coincident with the start thereof, a method of reorienting the transducer to a selected field within the track comprising the steps of:

determining and storing the number of the cell coincident with the start of the last field addressed by the transducer upon the occurrence of an error;

disconnecting the data storage device from the channel upon the occurrence of an error;

advancing the transducer to the index point on the track;

advancing the transducer from the index point to a cell the number of which equals the stored cell number minus a first number;

advancing the transducer from the cell the number of which equals the stored cell number minus a first number to a cell the number of which equals the stored cell number minus a second number smaller than the first number and simultaneously looking for a particular channel command from the channel during a selected time interval;

advancing the transducer from the cell the number of which equals the stored cell number minus the second number to the cell the number of which is stored and connecting the data storage device to the channel if the particular channel command is received from the channel during the selected time interval; and connecting the data storage device to the channel and advancing the transducer from the cell the number of which equals the stored cell number minus the second number past the index point to a cell the number of which equals the stored cell number minus the second number and then to the cell the number of which is stored if the particular channel command is received from the channel after the occurrence of the selected time interval.

8. The invention set forth in claim 7, wherein the first number is 16 and the second number is 8.

9. In a subsystem in which at least one transducer is positioned relative to a plurality of data tracks on a record member to effect data processing in response to commands from a channel to which the subsystem is selectively coupled, the data tracks moving relative to the transducer in cyclic, repeating fashion and each being divided into a plurality of cells numbered consecutively along the length thereof from a reference point and having a succession of fields arranged along the length thereof so that the boundaries thereof coincide with the boundaries of the cells, an arrangement for reorienting the transducer to the location of a detected error in a track being addressed by the transducer comprising the combination of:

means responsive to detection of an error in the data processing for storing the cell number of the cell at the beginning boundary of the last field addressed by the transducer before detection of the error;

means responsive to detection of the error in the data processing for disconnecting the subsystem from the channel;

means responsive to detection of the error in the data processing for sensing the occurrence of the reference point at the transducer;

means responsive to sensing of the occurrence of the reference point at the transducer for sensing the occurrence at the transducer of a first location following the occurrence of the reference point having a cell number equal to the difference between the stored cell number and a first number;

means responsive to sensing of the occurrence at the transducer of the first location for initiating a timed interval of predetermined length;

means responsive to sensing of the occurrence at the transducer of the first location for sensing the occurrence at the transducer of a second location having a cell number equal to the difference between the stored cell number and a second number;

means responsive to the occurrence of a predetermined command from the channel during the timed interval of predetermined length and to the occurrence at the transducer of the second location for reconnecting the subsystem to the channel prior to the occurrence of the stored cell number at the transducer; and means responsive to the occurrence of a predetermined command from the channel after termination of the timed interval of predetermined length for reconnecting the subsystem to the channel and advancing the transducer past the second location, the stored cell number, the reference point and then the second location.

*10. In a subsystem comprising a controller and at least one disk file in which at least one transducer is positioned relative to a plurality of data tracks on a record member to effect data processing in response to commands supplied to the subsystem, the data tracks moving relative to the transducer in cyclic, repeating fashion and each being divided into a plurality of cells numbered consecutively along the length thereof from a reference point and having a succession of failure independent fields arranged along the length thereof so that boundaries of the fields are related to the boundaries of the cells, apparatus for reorienting the transducer to the location of a detected error in one of the fields in the track comprising the combination of:*

*means responsive to detection of an error in one of the fields during reading of the track for storing the cell number of the initial cell of the last failure independent field addressed by the transducer before detection of the error; and*

*means operative, after detection of the error and while the transducer is being moved relative to the track past the reference point, to defer rereading of the field in error until the transducer is positioned at said initial cell of said last failure independent field addressed by the transducer before detection of said error.*

*11. In a subsystem of the type wherein at least one transducer is positioned relative to a cyclically movable data track on a record member to effect data transfer to and from said track, said track having a succession of command addressable records whose addresses are independent of their physical location along the track, each such record having a plurality of failure independent fields of at least a predetermined minimum number of byte positions arranged along the length of said track, the improvement comprising apparatus for insuring that only that field of a record containing a detected error is reread during reorientation of the transducer to the location of the detected error to avoid generating two independent errors in the same record when the record is reread, during a subsequent revolution said apparatus comprising:*

*means for establishing cell pulses at equal time intervals to effectively divide the track into a plurality of equal fixed length cells, each cell having a length at least equal to said predetermined number of byte positions so that the start of each field is relatable to only one respective specifically identifiable cell;*

*means responsive to detection of an error in a record for storing the number of a cell related to the last failure independent field read by the transducer before detection of said error; and*

*means operative after detection of the error to defer rereading of the record in error until the transducer has passed all failure independent fields in the record in error read prior to the field in error.*

*12. In an apparatus for recording and reading data from a cyclic magnetic recording track on which data is recorded as a plurality of separately addressable records whose addresses are independent of the physical location of said record on said track, and wherein each record comprises a plurality of failure independent fields each including at least a predetermined minimum number of byte positions, and wherein on detection of an error in one of said fields, the field in error is reread by a transducer during reorientation of the transducer on a subsequent revolution to the location of the detected error, the improvement comprising:*

*means for generating a plurality of timing pulses at a frequency related to the data rate of said magnetic recording track, said timing pulses being spaced apart a distance not more than said predetermined minimum number of byte positions;*

*means for controlling the recording and reading of each of said failure independent fields to insure that only one field is started between any two successive timing pulses;*

*means for storing an identification of a field in error upon the occurrence of an error; and*

*means including means responsive to the timing pulse associated with the start of the field in error to initiate rereading of the field in error in the revolution following that during which the error occurred, thereby to insure that when an error has occurred in one of the fields, previously read fields of the record in error will not be reread.*

* * * * *